United States Patent [19]

Sloan

[11] Patent Number: 5,047,960
[45] Date of Patent: Sep. 10, 1991

[54] APPARATUS AND METHOD TO AUTOMATE DATA ENTRY INTO AN APPLICATION PROGRAM

[76] Inventor: Scott K. Sloan, 9444 Saw Tooth Way, San Diego, Calif. 92129

[21] Appl. No.: 293,311

[22] Filed: Jan. 4, 1989

[51] Int. Cl.$^5$ .............................................. G06F 15/20
[52] U.S. Cl. .................................................. 364/523
[58] Field of Search ........ 364/518, 521, 200 MS File, 364/900 MS File, 523; 340/723, 724

[56] References Cited

U.S. PATENT DOCUMENTS

| | | | |
|---|---|---|---|
| 4,056,850 | 11/1977 | Brown | 364/900 |
| 4,124,838 | 11/1978 | Kiss | 340/1 R |
| 4,357,672 | 11/1982 | Howells et al. | 364/561 |
| 4,498,145 | 2/1985 | Baker et al. | 364/900 |
| 4,539,638 | 9/1985 | Gaffney | 364/200 |
| 4,542,477 | 9/1985 | Noyori et al. | 364/900 |
| 4,555,699 | 11/1985 | Citron et al. | 340/707 |
| 4,564,928 | 1/1986 | Glenn et al. | 367/117 |
| 4,604,686 | 8/1986 | Reiter et al. | 364/200 |
| 4,638,312 | 1/1987 | Quinn et al. | 340/825.35 |

OTHER PUBLICATIONS

"Microsoft Works Reference", pp. 180-237 and 369-385 1987.

*Primary Examiner*—Heather R. Herndon
*Attorney, Agent, or Firm*—Flehr, Hohbach, Test, Albritton & Herbert

[57] ABSTRACT

An apparatus and method for transferring desired data from an existing data source in a computer system to an application program. The existing data source is first converted into visibly formatted data output which is at a location separate from the computer system. The desired data is then selected from the visible format. The desired data is able to be transferred into the application program merely in response to the selection from the visibly formatted data without using of a keyboard.

35 Claims, 4 Drawing Sheets ( PRIOR ART )
FIG.−1

| ENGINE PART NO. | |
|---|---|
| SPARK PLUGS | HOSES |
| CHAMPION | 1/2 HOSE |
| AC | 1/4 HOSE |
| GENERAL MOTORS | 1/8 HOSE |

P=3, P=2, P=1

B

| MACROS | |
|---|---|
| NEW GOODS RECEIVED | PRINT PURCHASE ORDER |
| SHIP PURCHASE ORDER | |

P=5, P=4

C

| CITIES | |
|---|---|
| NEW YORK | LOS ANGELES |
| SEATTLE | BOSTON |

D

| QUANTITIES | |
|---|---|
| ONE THOUSAND | SEVENTY FIVE |
| FIVE HUNDRED | FIFTY |
| ONE HUNDRED | TEN |

APPARATUS AND METHOD TO AUTOMATE DATA ENTRY INTO AN APPLICATION PROGRAM

The present invention relates generally to an apparatus and method for automating user input into a computer data processing system. More particularly, the invention relates to an automated data input system wherein the computer operator selects or points to a descriptive term printed on paper, which causes the invention to automatically enter corresponding data into the computer data processing system.

BACKGROUND OF THE INVENTION

Typing data into a keyboard is the most common means to input data into a data processing system running an application software program. To enter data, the computer operator is usually required to laboriously type in long strings of letters and/or numbers read from a printed list. The typed in data is then available for processing by the CPU running the application program.

Several problems are associated with using keyboards as data input devices. Using a keyboard for data entry is a time consuming and tedious task. The computer operator is prone to make typing errors and mistakes while finding and reading the data to be entered. Furthermore, the computer operator is subject to fatigue and eye strain due to looking into a CRT screen for extended periods of time. More recently, alternatives to key board data input devices have become available. In U.S. Pat. No. 4,555,699, a computer data input system is disclosed. The device operates by detecting a stylus position on an entry tablet. The stylus generates signals representing position, and the signal is transmitted to a processor. The processor then displays stylus position on a CRT. In the preferred embodiment, a graph is also displayed on the CRT to provide an intelligent meaning to the stylus position to a computer operator.

In U.S. Pat. No. 4,638,312, an order entry system is disclosed. The order entry system includes a display showing, pictorially, the elements or items to be selected from the menu. An aiming selector is used to make the desired selection. Each item on the menu contains a light responsive detector which is selected by directing the aiming selector at the desired item. A controller is adapted to receive and process the selected items.

The prior art also includes many types of data tablets for centering pairs of (x,y) coordinates. See for example, U.S. Pat. Nos. 4,564,928, 4,357,672, and 4,124,838. A mouse for selecting icons appearing on a CRT screen is also a known data input device.

The prior art, as set forth above, fails to disclose a system which automates entry of data printed on computer paper into application programs running on a data processing system.

SUMMARY OF THE INVENTION

In view of the above discussion, it is a primary object of the invention to provide a device to automate data entry wherein the computer operator selects or points to a descriptive term printed on computer paper which characterizes the data to be entered.

It is another object of the invention to provide a device to automatically generate an unlimited number of the descriptive terms on computer paper.

The apparatus of the invention can extract desired data from a data base in a computer system which has been generated by or existed in a source application program (such as Dbase, Lotus, or work processor). The extracted desired data may then be transferred into a goal application program through a key board buffer or serial port of a computer. The goal application program could be the same type of application program as the source application program or it could be a different type. The data base, from whence the desired data are extracted, are first converted to visible format data output in a location separate from the computer system. The visible format data output has location information on each data item. The data base is also stored in a memory buffer area with each data item having the same location information corresponding to the data item in the visible format data output. The present invention includes a mechanism to convert the location information on the visible format data output into the location information which can be recognized by the computer system. When an operator selects a data item from the visible format data output according to the location information, the data item which has the same location information in the memory buffer is identified and sent to the keyboard buffer or serial port of the computer. From the key board buffer or serial port, the goal application program receives the extracted data item.

The visible format data output may also include program macros designed by an operator. The present invention includes devices for converting the program macros into commands which can be recognized by the application program.

In accordance with the above and other objectives, the present invention relates to an apparatus and method for automating user input into an application program. The apparatus and method includes generating an index list of strings having data fields and a printed list of items corresponding to the strings. A means is provided for selecting one of the items in the printed list. When an item is selected, the data in a field(s) of the corresponding indexed string is accessed and is automatically entered into the application program through the keyboard buffer of the system.

BRIEF DESCRIPTION OF THE DRAWINGS

Additional objects and features of the invention will be more readily apparent from the following detailed description and appended claims when taken in conjunction with the drawings, in which:

FIG. 2(a)-(b) is a block diagram showing a resident memory program, a multiplicity of computer printout pages and an (x,y) data input device in the data processing system according to the present invention.

DESCRIPTION OF THE PREFERRED EMBODIMENT

Figure 1:
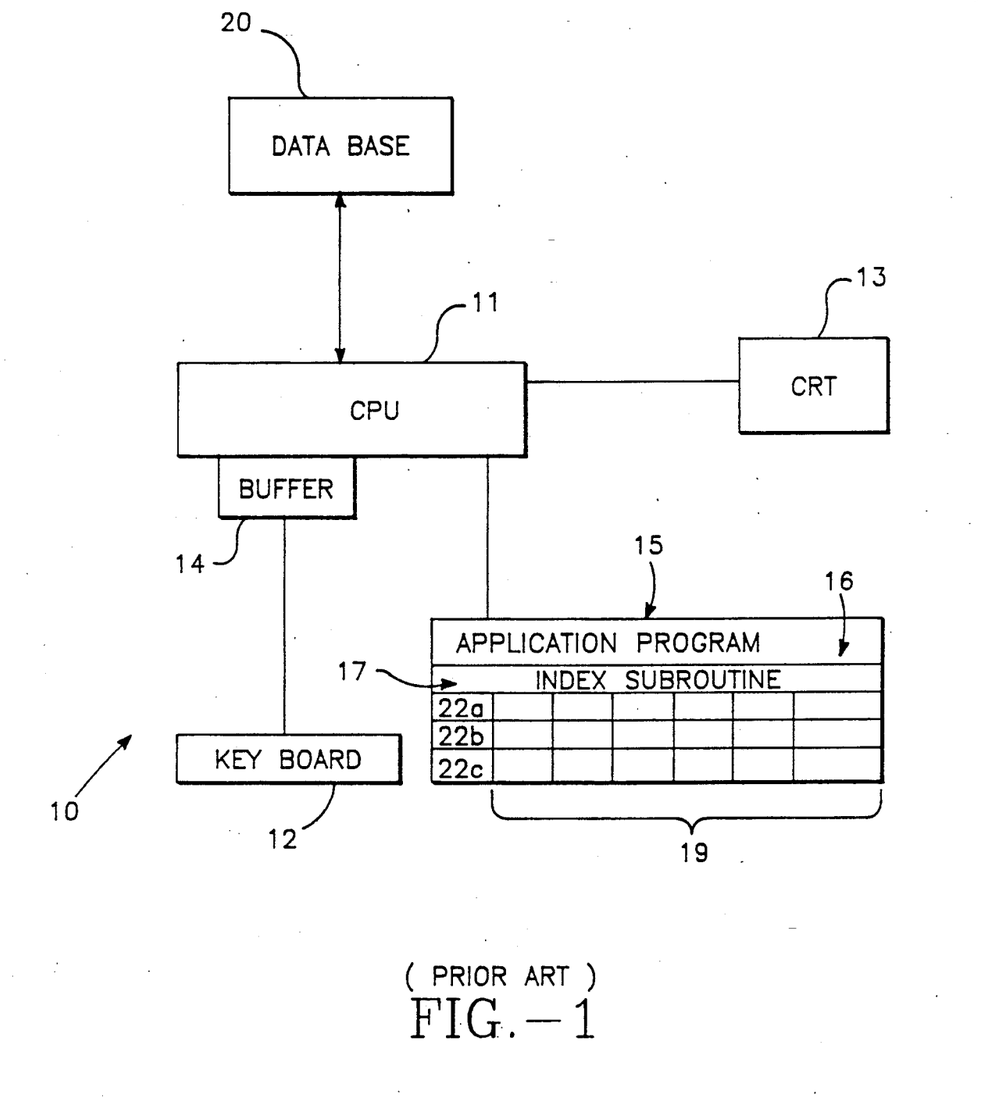
FIG. 1 is a block diagram of a prior art data processing system having an application program and a data base stored in the memory of a computer data processing system.

Referring to FIG. 1, a block diagram of a prior art data processing system is shown. The data processing system 10 includes a central processing unit (CPU) 11, a CRT display 13, a keyboard 12, a key board buffer 14 and a computer memory 15. Loaded into system memory 15 is an application program 16 having an index subroutine 17 to index data fields 19. The data fields 19 may be arranged in a data base 20 having a multiplicity of records 22 (a-n), each containing related data stored in a plurality of the fields 19. Other programs may also be loaded into memory 15.

During operation of the data processing system 10, data is entered into the system 10 running application program 16. Prompts appearing on the CRT ask the computer operator to enter the requested data. In response, the computer operator types in the information on keyboard 12, whereafter the data is temporarily stored in the keyboard buffer 14. Keyboard buffer 14 transfers its contents to the CPU when it receives a synchronized clock signal from the CPU. Hence, the data required for the continued CPU execution of the application program 16 and the update of data base 20 is entered into the system 10. This sequence of steps is repeated for the next prompt appearing on the CRT.

Figure 2A:
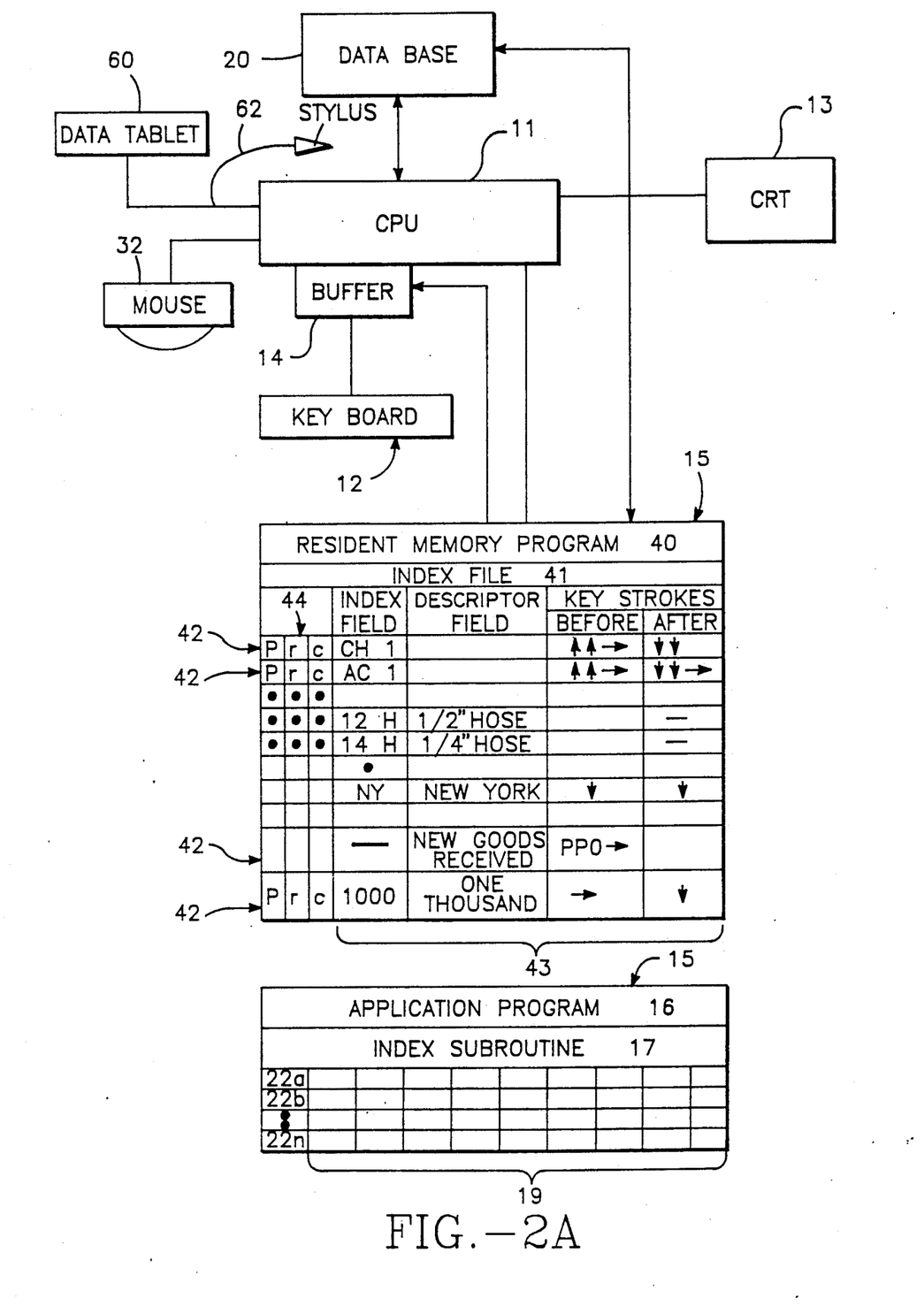

Referring now to FIG. 2, a data processing system 30 for automating data input according to the present invention is shown. The system 30 includes a CPU 11, a CRT 13, a keyboard 12, a keyboard buffer 14, a system memory 15 and an (x,y) data input device 32 such as a mouse. The system 30 also includes a plurality of computer printout pages numbered consecutively (p 1,2,3 . . . n). Such computer printout pages are generated from existing data base 20 which has been generated by an application program such as Dbase, Lotus or work processor. In the preferred embodiment, the pages are arranged into a plurality of books, each designated by a letter (A, B, C . . . Z). For example, if the pages in book A are numbered from (p=1) through (p=3), the first page for book B is (p=4).

A multiplicity of user friendly descriptive terms, pictorial icons or items 36 are printed in rows and columns on pages. Accordingly, every item 36 on each page is identified by a (p,r,c) coordinate. A first set of four points 37, each located in a corner of a page, signifies a predetermined reference point in relation to the rows and columns on each page. The points 37 are at the same position on every page and provide a means for the operator to align the pages in each book. A single identifier point 38 signifies the page number p=(1,2, .. . n) for each page. Note, the page identifier point 38 on each page is in a different position to distinguish one page from another.

As shown in FIG. 2, a resident memory program 40 is stored in system memory 15 in the computer data processing system 30. The resident memory program 40 includes in resident memory an index subroutine or file 41 for accessing data in an index list of strings 42. Each string 42 contains a multiplicity of fields 43 for storing related data. The data strings 42 are identified in the index list by an (p,r,c) address 44. The (p,r,c) address 44 corresponds to an item 36 having the same (p,r,c) coordinate on one of the pages.

The fields 43 in a data string 42 include data corresponding and related to the descriptive term 36. For example, referring to book A, page 1, the data string corresponding to item 36 "CHAMPION" in the "Engine Parts No." list includes an index field to store the spark plugs identification number "CH1," a field for storing the descriptor term 36 formatted on the pages, and a field or fields for storing various keystrokes that invoke application program 16 subroutines when the data is entered into the application program 16. For instance, a "before" set of keystrokes may place the identifier number "CH1" in the appropriate CRT display location. An "after" set of keystrokes may place the CRT prompt in the desired CRT display location after the part number has been entered.

The resident memory program 40 is capable of transferring the data stored in any field 43 having a specific (p,r,c) index address 44 and entering it into the keyboard buffer 14 when the corresponding item 36 with the same (p,r,c) coordinate is selected by mouse 32. In an alternative embodiment, the index subroutine 17 accesses the data fields 19 in the application program 16 and/or data base 20 using the application program's index subroutine 17.

To automate data entry to the application program 16, the computer operator finds the desired descriptive item 36 on a page to be entered. The operator then places the mouse 32 to one of the reference points 37 on the page the item 36 is located on and clicks the mouse 32 to inform the resident memory program 40 that the mouse 32 is at a predefined reference point. The operator rolls the mouse 32 to page identifier point 38 on the page and clicks the mouse 32 again. Depending on the (x,y) distance travelled by the mouse, the resident memory program 40 determines the page number p (1,2, . . . n) the mouse is located on. To select the specific item 36, the operator rolls the mouse across the page to the desired data item 36 and clicks the mouse a third time. The memory resident program 40, monitoring the (x,y) distance the mouse 32 has traveled from the page identifier point 38, has the necessary (p,r,c) information to access the corresponding data string 42 in the index list.

To enter a second item 36 on the same page, the operator need only roll the mouse from the first item to the second item. The resident memory program 40, monitoring the (x,y) distance the mouse has traveled between the first and second items, has the necessary (p,r,c) information to access the corresponding data string 42 in the index list. To enter a second item 36 from another page, the steps of moving the mouse to a reference point 37, moving the mouse to the page identifier 38 and then to the item 36 must be repeated.

Figure 3:
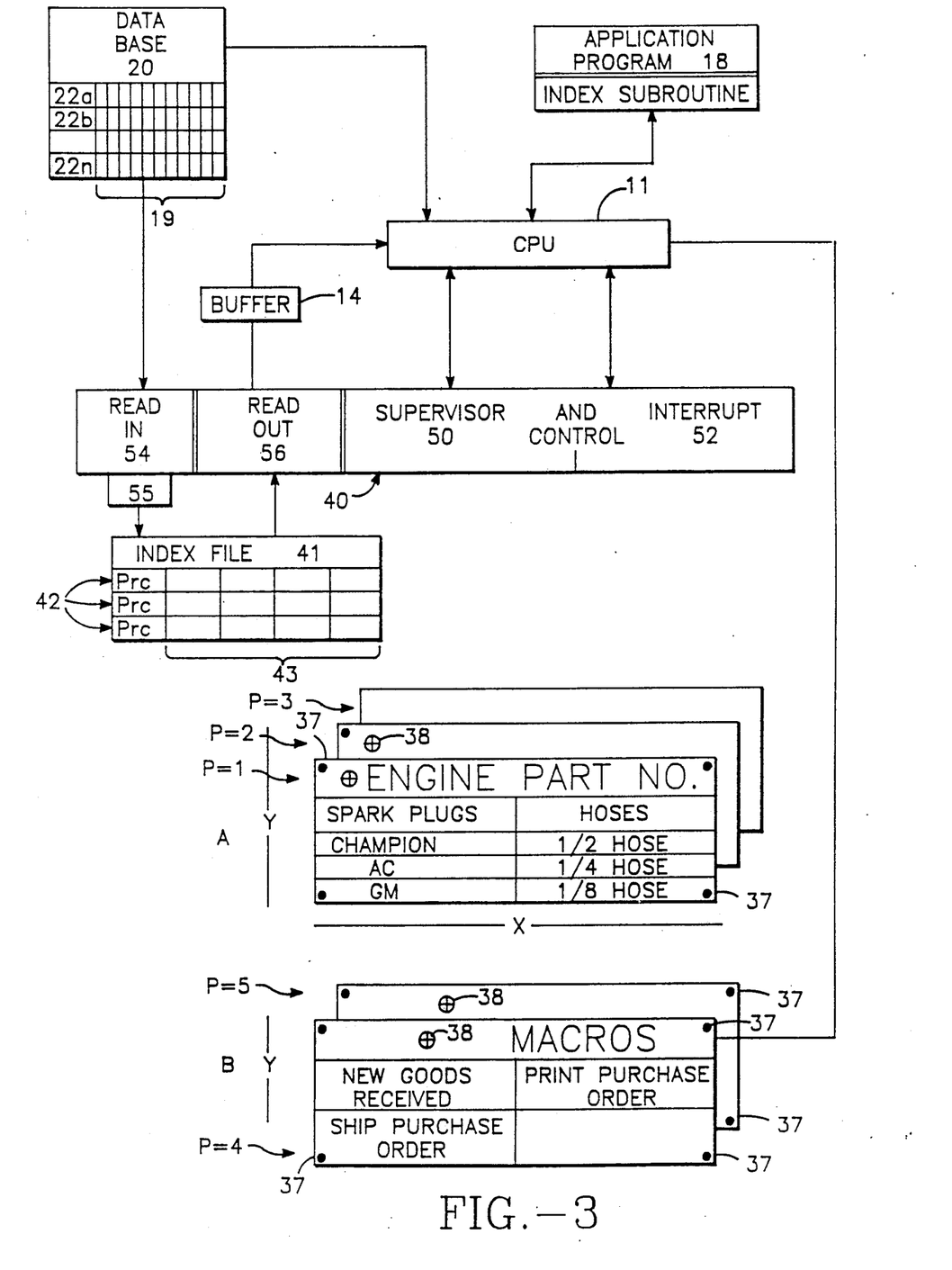
FIG. 3 is a block diagram of the resident memory program's component subroutines showing the flow of data in the present invention.

Briefly describing the operation of the present invention as shown in FIGS. 2 and 3, the resident memory program 40 runs concurrently with the application program 16 on the CPU in system 30. The resident memory program 40 appears invisible to the computer operator, and the sequence of prompts that normally appear on the CRT during the execution of application program 16 remain unchanged.

According to the invention, to enter data in response to a prompt asking the operator to enter specific information, the computer operator manipulates mouse 32 in the aforementioned manner to select the desired item 36 on a page. For example, if the prompt calls for the computer operator to enter the identification number for one half inch hose, the computer operator selects from a list of "Engine Part No." with mouse 32 the descriptive term, i.e. "½ Hose" in book A, page one.

The resident memory program 40 monitors and ascertains the (p,r,c) for "½ Hose" and translates it into the appropriate (p,r,c) resident memory address 44. The resident memory program accesses the corresponding data string 42 having the same (p,r,c) address 44 in the index list, and automatically transfers the contents of the index field containing the number "12H" into the keyboard buffer 14. Once inside the keyboard buffer 14, the data is transferred to the CPU for processing in the identical way as described above in conjunction with FIG. 1. In general, the application program 16 cannot distinguish between data entered by keyboard 12 or from the pages using mouse 32.

FIG. 3 is a block diagram of the resident memory program's 40 component subroutines to illustrate the flow of data in the data processing system of FIG. 2. The resident memory program 40 includes the following component parts: a supervisory subroutine 50; a interrupt control routine 52; a data read or input routine 54; a data extraction routine 55; a data write or output routine 56; and a resident memory 58 for storing the index file 41 of data strings 42 and fields 43.

The supervisory subroutine 50 is responsible for allocation and scheduling of CPU processing time between the resident memory program 40 and the application program 16. The supervisory routine 50 permits both the resident memory program's 40 instructions and the application program's 16 instructions to be alternatively executed by the CPU. The interrupt control routine 52 responds to a mouse 32 selection signal by interrupting CPU processing of the application program 16. The resident memory program thereafter interprets the (p,r,c) coordinates by measuring the (x,y) distance the mouse has traveled, and places the data from the corresponding field 43 into the keyboard buffer 14. The interrupt routine then returns CPU control to the application program 16.

The read routine 54 reads the fields 19 in application program and/or data base 20 records 22a through 22n and creates in the resident memory 58 the index list 41 of data fields 43. The extraction routine 55 produces a concordance of all the distinct data values in the data base 20, and stores the data values into the appropriate fields 43. The data output routine 56, under the instructions of the supervisor routine 50, outputs data stored in the fields 43 to various periphery devices, for example, the keyboard buffer 14.

The method of the resident program 40 is broken down into distinct steps: generating an index file 41 to access the resident index list of data strings 42 and fields 43; storing data read from an existing application program and/or data base 20; formatting the user friendly descriptive items 36 on the pages; and utilizing the index list to enter data into the application program 16 when an item 36 selection is made on one of the pages.

In the first step, to create the index file 41 and list, the system operator prints an ASCII or other user friendly file of the application program and/or data base 20. The resident memory program reads the ASCII file, and places the concordance of unique data values into the resident data strings 42 and fields 43 in the index list. Alternatively, the resident memory program 40 may create the index file 41 by accessing the application program's stored data base 20 directly to index of fields 19 in the application program. In the next step, the descriptive items 36 are formatted and printed on the pages in both alternative indexing means described in step one. The resident memory program 40 stores the (p,r,c) addresses for the strings 42 in the index list corresponding to the items 36 on the pages.

The format parameters for organizing the items 36 on the pages are provided by the computer operator. The items 36 can be formatted in a variety of ways by rows and columns, including, but not limited to modifying the number of rows, the number of columns, the font style, the font size, and the number of pages, which data fields 43 in each string 42 to print, and which field or fields 43 contains the data to be transferred to the keyboard buffer 14 when the corresponding item 36 is selected. Accordingly, the operator has complete control to customize the organization of the items 36 appearing on the printouts 36. If desired, virtually an unlimited number of items 36 may be placed on a single printout 36.

In the third step, the resident memory program 40 and the resident list is loaded into memory 15. The application program 16 is loaded into memory 15. The (x,y) data input device 32 is connected to the CPU and the pages of each book are aligned and bounded. The system 10 is ready for data processing.

By way of example, in the embodiment chosen for purposes of describing the operation of the resident memory program 40, the application program 16 is an inventory control system for an auto part warehouse. It will be understood by those skilled in the art that any application program having may .be used concurrently with the present invention.

As best illustrated in FIG. 2, an example of the page format for the descriptive items for an autopart warehouse inventory program is shown. The descriptive items 36 for a list of "Engine Part No." is formatted in rows in the first book. Similar books and pages are made for a listing of auto part suppliers cities, a listing of auto part retailers, the key strokes that initiate custom entered resident program 40 macros designed by the operator, inventory control program macros, code numbers, text and the like.

During normal operation, the inventory control program provides a CRT prompt calling for the computer operator to type in the next inventory transaction to be performed. For example, to update the inventory data base 20 to include a new shipment of "CHAMPION" spark plugs, the operator first selects with mouse 32 a macro descriptive item 57 entitled "NEW GOODS RECEIVED." In response to the selection, the resident memory program 40 transfers the macro's keystrokes stored in the corresponding field or fields 43 into the keyboard buffer 14. Once the keystrokes are in the keyboard buffer 14, CPU control is switched back to the inventory program 16, which responds to the keystrokes by invoking an update inventory subroutine.

The inventory program 16 next generates a CRT prompt calling for the part identification number. The user then selects the descriptive item 36 "CHAMPION" spark plug from the "Engine Part No." list of book A. The resident memory program 40 accesses the corresponding data string 42 and index field storing the "CHAMPION" spark plug identification number "CH1" and inputs it to the keyboard buffer 14.

The inventory program then generates a prompt calling for the quantity to be entered. The user can then either type in the quantity on keyboard 12 or select a numerical descriptive term 36 as shown in book D. Once the data is in the keyboard buffer 14, it is processed by the inventory program. Upon completion, the inventory program generates another prompt asking for the next inventory transaction.

In an alternative embodiment, the mouse 32 may be replaced by any device capable of generating and transmitting to the CPU (x,y) coordinate signals. Examples of such devices include, but are not limited to, data tablets or digitizers 60 having a stylus 62. A printout with items 36 arranged thereon is placed over the tablet surface. To select an item 36, a stylus is pointed to the item 36. In response thereto, the tablet 60 generates an (x,y) signal to provide the resident memory program 40 the required (p,r,c) information to access the corresponding string 42. The data is entered in the same manner as described above. Similarly, the items 36 may be placed on a touch sensitive membrane display and the operator may select an item for input by touching the item 36 appearing on the display or using a mouse device. While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system, apparatus for automatically inputting desired data into an application program by extracting the desired data from a data source in the computer system and printing it out from the computer system in a visible format comprising:

means for storing said data source as an index list of predefined strings in a memory area of said computer system;

means for converting said data source into said visible format as a visible listing of items with each item in said listing of items corresponding to a predefined string in said index list wherein said visible listing of items is separate from said computer system;

means for selecting one of said items in said visible listing, and identifying a corresponding predefined string in said index list; and means for inputting the corresponding string into a specified application program.

2. In a computer data processing system, an apparatus for automatically inputting desired data into an application program by extracting the desired data from a data source in the computer data processing system and printing it out from the computer data processing system in a visible format comprising:

means for storing said data source as an index list of predefined strings in a memory area internal of said data processing computer system;

means for converting said data source into said visible format as a printed list of items with each item in said printed list of items corresponding to a predefined string in said index list wherein said printed list of items is separate from computer data processing system;

means for selecting one of said items in said printed list; and means for inputting a corresponding predefined string into a specified application program for data processing.

3. Apparatus as set forth in claim 2, wherein said specified application program is an application program being capable of generating and/or operating a multiplicity of records, each said record having a multiplicity of distinct fields for storing related data;

said index list including a plurality of predefined multifield strings having data values for a plurality of fields; and whereby a selection of an item in said printed list causes said apparatus to input data from said corresponding string into the application program for update.

4. Apparatus as set forth in claim 3, further including list extraction means for reading the data in said distinct fields of said multiplicity of records in the application program, said list extraction means producing a concordance representing distinct data values stored in at least one of said plurality of fields in said data base.

5. The apparatus as set forth in claim 4, wherein said strings in said index list include said concordance of data values.

6. The apparatus of claim 2, wherein said list of items comprise user friendly descriptive terms which characterize the data in said predefined strings in said index list.

7. The apparatus of claim 2, wherein said printed list comprises a formatted list of said items, each said item having a specified (p,r,c) coordinate, said selecting means is generally an (x,y) device for generating a signal for said apparatus to interpret said (p,r,c) coordinate of said selected item, and said imputing means including means for identifying the corresponding string in said index list based on said (p,r,c) coordinate and means for storing and transferring said corresponding string to the application program.

8. The apparatus of claim 7, wherein said printed list comprises a printed list of items on at least one piece of paper, said paper having at least one first reference information signifying a predetermined (x,y) coordinate on said paper, and a second reference information distinguishing each piece of said paper.

9. The apparatus of claim 8, wherein said (x,y) device is an electronic mouse adapted to be moved from said first reference point to the location of a selected item in said printed list, said mouse capable of generating an electronic signal signifying the x and y distance traveled from said first reference point to the selected item.

10. The apparatus of claim 7, wherein said (x,y) device comprises at least one tablet having a stylus, said data tablet adapted to generate an said (x,y) signal specifying the item selected by said stylus.

11. Apparatus as set forth in claim 2, wherein said printed list of items include designations for keystrokes, application program macros, code numbers and text;

said predefined strings include a plurality of fields for storing data, which, when input to a specified application program, automatically input the keyboard commands to the computer system to automatically update said specified application program; and said keystroke and application program macros can be selected in a location separate from the computer data processing system.

12. In a computer data processing system, a method for automatically imputing desired data into an application program by extracting the desired data from a data source in the computer data processing system and printing it out from the computer data processing system in a visible format, comprising the steps of:

storing said data source as an index list of predefined strings in a memory area internal said computer data processing system;

converting said data source into said visible format as a printed list of items with each item in said printed list of items corresponding to a predefined string in said index list wherein said printed list of items is separate from said computer data processing system;

selecting one of said items in said printed list, and identifying a corresponding string in said index list; and inputting the corresponding string into a specified application program for data processing.

13. The method of claim 12, wherein said step of converting said data source into said visible format as a printed list of items further includes the step of:
providing the system with printout format parameters to identify locations of corresponding strings of said items printed on said printed list in said index list.

14. The method of claim 13, wherein said printout format parameters include the number of rows, the number of columns, the font size and the number of pages printed on the printed list.

15. The method of claim 12, wherein said predefined strings each contain at least one data field for storing the data to be transferred to the application program when said item corresponding to said data string is selected.

16. The method of claim 15, wherein said index list storing step further includes the step of:
providing the system with filed format parameters to control the access of said data field containing the data in a predefined string corresponding to a selected item for imputing to the application program.

17. In a computer system, an apparatus for automatically transferring desired data from a data source into an application program, the data source having been generated by an application program such as Dbase, Lotus or word processor in the computer system, said apparatus comprising:
means for converting said data source into visible formatted data at a location separate from said computer system, said visible formatted data having location parameters to identify locations of said visible formatted data;
means for selecting data from said visible formatted data at said location separate from said computer system; and
means for extracting said data in response to selections of said data selecting means.

18. In a computer system, an apparatus for automatically transferring desired data from a data source into an application program, the data source having been generated by an application program such as Dbase, Lotus or work processor in the computer system, said apparatus comprising:
means for generating program macros at a location separate from said computer system, said program macros defining data processing operations of said application program;
means for selecting said program macros at said location separate from said computer system; and
means for activating said data processing operations of said application program in response to selections of said program macros selecting means.

19. The apparatus of claim 17, further comprising:
means for storing said data resource at a memory area internal of said computer system;
means for detecting said location parameters on said visible formatted data; and
means for identifying location relationship between each data item in said visible formatted data and a corresponding data item in said memory area.

20. The apparatus of claim 19, further comprising:
means for buffering said data item before said data item is transferred from said memory area into said application program.

21. The apparatus of claim 19, further comprising:
means for buffering said program macros after said program macros are selected by said program macros selecting means.

22. The apparatus of claim 19, wherein said means for detecting said location parameters including an electronic mouse and/or a stylus.

23. The apparatus of claim 22, wherein said means for detecting said location parameters including at least one tablet.

24. The apparatus of claim 19, wherein said visible formatted data are printed on a plurality of pieces of papers, said plurality of pieces of papers including position information to identify paper order and position of each data item on said plurality of pieces of paper.

25. The apparatus of claim 19, wherein each data item of said data source in said memory area associates with position information stored in said memory area.

26. The apparatus of claim 19, wherein each data item of said data source in said memory area associates with command information, which is stored in said memory area, to invoke subroutines when said data item is entered into said application in response to a selection of one of said program macros.

27. The apparatus of claim 26, wherein said command information is keystroke.

28. The apparatus of claim 18, further comprising:
means for converting said data source into a visible formatted data at said location separate from said computer system, said visible formatted data having location parameters to identify locations of said visible formatted data;
means for selecting data from said visible formatted data at said location separate from said computer system; and
means for extracting said data in response to selections of said data selecting means and selections of said program macros selecting means.

29. The apparatus of claim 18, wherein said program macros keystrokes.

30. The apparatus of claim 18, wherein said program macros are designed as readable instruction.

31. In a computer system, a method for automatically transferring desired data from a data source into an application program, the data source have been generated by an application program such as Dbase, Lotus or word processor in the computer system, comprising:
converting said data source into a visible formatted data at a location separate from said computer system, said visible formatted data having location parameters to identify locations of said visible formatted data;
selecting data from said visible formatted data at said location separate from said computer system; and
extracting the selected data.

32. In a computer system, a method for automatically transferring desired data from a data source into an application program, the data source have been generated by an application program such as Dbase, Lotus or word processor in the computer system, said method comprising:
converting said data source into a visible formatted data at a location separate from said computer system, said visible formatted data having location parameters to identify locations of said visible formatted data;
generating program macros at said location separate from said computer system, said program macros defining data processing operations of said application program;

selecting data from said visible formatted data at said location separate from said computer system; and selecting said program macros at said location separate from said computer system; and activating said data processing operations of said application programs in response to the selected data and the selected program macros.

33. The method of claim 33, further comprising the step of:

buffering said program macros after said program macros are selected.

34. The method of claim 32 or 33, comprising the steps of:

storing said data source at a memory area internal of said computer system;

detecting said location parameters on said visible formatted data; and identifying location relationship between each data item in said visible formatted data and a corresponding data item in said memory area internal of the computer system.

35. The method of claim 34, further comprising the step of:

buffering said data item before said data item is transferred from said memory area into said application program.

* * * * *